H. H. GARDNER.
BUMPER FOR VEHICLES.
APPLICATION FILED DEC. 16, 1907.
911,715.
Patented Feb. 9, 1909.
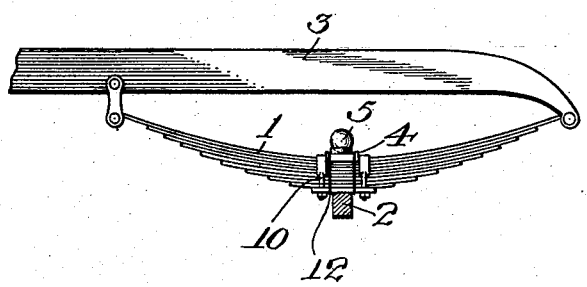
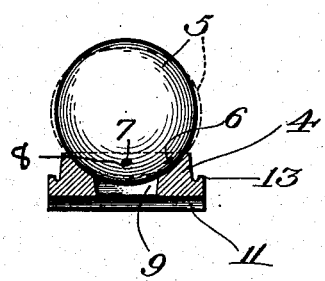
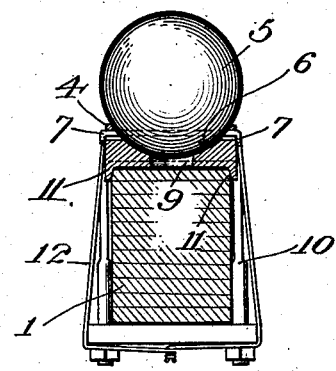
Witnesses:
Inventor:
Henry Howard Gardner
by
his Attorneys

UNITED STATES PATENT OFFICE.

HENRY HOWARD GARDNER, OF SANTA ANA, CALIFORNIA.

BUMPER FOR VEHICLES.

No. 911,715.   Specification of Letters Patent.   Patented Feb. 9, 1909.

Application filed December 16, 1907. Serial No. 406,807.

*To all whom it may concern:*

Be it known that I, HENRY HOWARD GARDNER, a citizen of the United States, residing at Santa Ana, in the county of Orange, State of California, have invented a new and useful Bumper for Vehicles, of which the following is a specification.

This invention relates to a bumper for absorbing the shock due to collapse or excessive yielding of the springs of a vehicle, as in passing over rough roads.

An object of this invention is to provide a bumper which will be able to withstand the impact of the vehicle body, and to yield resiliently sufficiently to ease off the shock, without becoming permanently distorted or crushed, so as to lose its efficiency.

In the accompanying drawings:—Figure 1 is a side elevation of a vehicle spring with the bumper attached. Fig. 2 is a vertical section of the bumper. Fig. 3 is a vertical section of the bumper at right angles to Fig. 2, showing the attaching means.

1 designates a vehicle spring, 2 the axle supporting same, and 3 the bar or body member supported on said spring.

A holder or base member 4 is attached to axle 2, and provided with means for attachment of a resilient member 5 consisting of a ball of soft rubber, preferably solid, said ball seating in and on a flaring depression, seat or cup 6 in member 4, and being held in position by a pin 7, extending through the ball and through holes 8 in the holder 4, adjacent to the seat 6. Said holder 4 may have a central opening 9 to receive the head of a bolt, if one be used, to fasten the spring to the axle. If straps are used for this purpose, as indicated at 10 in Fig. 1, the holder 4 is placed between these straps. Holder 4 is provided with side flanges 11, embracing the spring to prevent lateral motion of the holder, and is held down on the spring by wires or straps 12, retained by end flanges 13.

When the spring 1 is violently compressed so that body member 3 strikes ball 5, the said ball yields by vertical compression and lateral extension, as indicated by dotted lines in Fig. 2. This capacity for lateral yield is due to the fact that the body of member 5 bulges or enlarges above the part which engages with the base member or holder, and thus presents a yielding portion which is not compressed into the cup of the holder 4, but is free to move laterally and downwardly to some extent. The spherical shape of the bumper member 5 also has the advantage that oblique pressure on the ball, due to swerving action of the vehicle body in its descent, will be received by the opposite face of the cup or seat on a portion of the ball that extends across the line of pressure, thus taking the pressure in the most advantageous manner.

What I claim is:—

1. In a bumper for vehicles, a base provided with depending flanges upon two of its edges and with upwardly extending flanges upon its other two edges, the central portion of the top of the base being provided with a cup-like seat, the wall of said seat being perforated at oppositely located points, a spherical ball of yielding material in said seat having a perforation to register with the perforations in the wall of the seat, and a pin through the perforations of the sphere and of the seat wall, the ends of said pin being bent to prevent its accidental removal.

2. In a bumper for vehicles, an axle, a spring thereon, clips engaging with the spring for holding it in position, a base on the spring between said clips provided with depending side flanges for engaging with said spring, and with end flanges and a cup like seat, the wall of the seat being perforated, a spherical ball of yielding material in said seat having a perforation to register with the perforations of said wall, a pin through the perforations of the sphere and said wall having its ends bent, and wires around the base and the spring and engaging with said end flanges.

In testimony whereof, I have hereunto set my hand at Los Angeles California this 7th day of December 1907.

HENRY HOWARD GARDNER.

In presence of—
 GEORGE T. HACKLEY,
 FRANK L. A. GRAHAM.